US010882940B2

(12) United States Patent
Moyses et al.

(10) Patent No.: US 10,882,940 B2
(45) Date of Patent: Jan. 5, 2021

(54) PROCESS FOR THE PRODUCTION OF COPOLYMERS

(71) Applicant: SABIC Global Technologies B.V., Bergen op Zoom (NL)

(72) Inventors: Stephan Moyses, Albany, NY (US); Chester Hassman, Newburgh, IN (US); Dejin Li, Newburgh, IN (US); Jianhua Xu, Newburgh, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 183 days.

(21) Appl. No.: 16/096,879

(22) PCT Filed: Apr. 13, 2017

(86) PCT No.: PCT/EP2017/058945
§ 371 (c)(1),
(2) Date: Oct. 26, 2018

(87) PCT Pub. No.: WO2017/186511
PCT Pub. Date: Nov. 2, 2017

(65) Prior Publication Data
US 2019/0135966 A1    May 9, 2019

(30) Foreign Application Priority Data

Apr. 29, 2016    (EP) ................................. 16167645

(51) Int. Cl.
| *C08F 279/04* | (2006.01) |
| *C08F 2/02* | (2006.01) |
| *C08F 2/06* | (2006.01) |
| *C08F 6/06* | (2006.01) |

(52) U.S. Cl.
CPC .............. *C08F 279/04* (2013.01); *C08F 2/02* (2013.01); *C08F 2/06* (2013.01); *C08F 6/06* (2013.01); *C08F 2400/02* (2013.01)

(58) Field of Classification Search
CPC ........................... C08F 2400/02; C08F 279/04
See application file for complete search history.

(56) References Cited

U.S. PATENT DOCUMENTS

| 2,886,553 A | * | 5/1959 | Stein ...................... C08F 279/02 |
| | | | 525/243 |
| 2,985,617 A | * | 5/1961 | Salyer ...................... C08L 23/02 |
| | | | 524/109 |
| 3,819,761 A | | 6/1974 | Lee |
| 5,034,482 A | * | 7/1991 | Kohara .................. C08G 61/08 |
| | | | 526/114 |
| 5,341,672 A | * | 8/1994 | Kawanami ............. G01N 25/18 |
| | | | 374/45 |
| 6,759,491 B2 | * | 7/2004 | Matyjaszewski ......... C08F 4/00 |
| | | | 526/206 |
| 2005/0222331 A1 | | 10/2005 | Hoshi et al. |
| 2011/0040035 A1 | | 2/2011 | Shields et al. |

FOREIGN PATENT DOCUMENTS

| CN | 1121938 A | 5/1996 |
| CN | 101506299 A | 8/2009 |
| EP | 0322931 A1 | 7/1989 |
| WO | 2007047120 A2 | 4/2007 |
| WO | 2010020374 A1 | 2/2010 |

OTHER PUBLICATIONS

International Search Report for International Application PCT/EP2017/058945; dated May 29, 2017; 3 pages.
Kuhn, R.; "Characterization of bimodal bigraft ABS", Colloid and Polymer Science, 1993, vol. 271, Issue 2, pp. 133-142.
Written Opinion of the International Search Report for International Application PCT/EP2017/058945; dated May 29, 2017; 6 pages.

* cited by examiner

*Primary Examiner* — Wenwen Cai
(74) *Attorney, Agent, or Firm* — Cantor Colburn LLP

(57) ABSTRACT

The present invention relates to a process for the production of copolymers comprising: (i) forming a reaction mixture comprising an elastomer and a vinyl aromatic compound; (ii) introducing the reaction mixture to a reaction vessel; and (iii) performing a polymerisation reaction wherein steps (i)-(iii) are performed in that order to obtain a copolymer comprising: (a) a phase comprising a reaction product of the elastomer with the vinyl aromatic compound; and (b) a phase comprising a reaction product of the vinyl aromatic compound wherein a sample of the reactor contents is obtained during step (iii) to determine of the formed copolymer: the content of phase (b); and/or ● the molecular weight of phase (b) wherein the determination of the content of phase (b) in the formed copolymer and the molecular weight of phase (b) is performed by a method comprising isolation of phase (b) from the sample of the formed copolymer and subjecting the obtained phase (b) to molecular analysis. Such process allows for the determination of the content of the phase (b) and of the molecular weight thereof in a quick and efficient manner, allowing for adjustment of process parameters such that the production of products that not correspond to the desired product quality is minimised.

11 Claims, No Drawings

PROCESS FOR THE PRODUCTION OF COPOLYMERS

CROSS REFERENCE TO RELATED APPLICATIONS

This application is a 371 of International Application No. PCT/EP2017/058945, filed Apr. 13, 2017, which claims priority to European Application No. 16167645.7, filed Apr. 29, 2016, both of which are incorporated herein by reference in their entirety.

The present invention related to a process for the production of copolymers. It further relates to copolymers obtained according to such process. It also relates to a method for determination of the quantity and the molecular weight of a phase of such copolymer.

Copolymers such as copolymers comprising a soluble and an insoluble phase, for examples acrylonitrile-butadiene-styrene copolymers are well-known thermoplastic polymers having a variety of properties rendering them particularly suitable for numerous applications, including for example is electronics, home appliances, transportation applications such as automotive body parts, in personal appliances such as protective headgear, and in construction.

Copolymers such as ABS copolymers commonly comprise an elastomeric material, such as a polybutadiene rubber, onto which a polymer such as a styrene-acrylonitrile (also referred to as SAN) polymer is formed by graft polymerisation. Further, the copolymers comprise a fraction of polymer that is not grafted onto the elastomer, forming a free polymeric phase. The copolymers thus comprise an elastomeric phase and a free polymeric phase.

In order to operate the production process of copolymer such as ABS in an efficient manner, it is required to control the degree of polymerisation of the free polymeric phase as well as the quantity of free polymer in the copolymer quickly and reliably. A quick and reliable manner for provide the needed control input to the production process contributes to reduction of off-spec material, i.e. material that does not comply to the desired production standards, as well as contributes to a reduced turnaround time between different copolymer grades, differing for example in their desired molecular weight or free polymer content, thus further reducing the quantity of off-spec material produced during grade switches. This may be beneficial both in a continuous production process, where grade changes are performed without interrupting the polymerisation process, as well as in batch production process, where a quick and reliable manner of control of the degree of polymerisation of the free polymer as well as the quantity of free polymer in the copolymer may contribute to reduction of the inactive time of a batch reactor between production batches.

In processes according to the state of the art, the determination of the degree of polymerisation of the free polymer and the quantity thereof in the copolymer such as ABS involves the isolation of the free polymer via for example a centrifuging step. However, this is a time-consuming step, which leads to the results not being usable for providing a timely control input to the production process.

For that reason, there is an obvious need to develop a process for the production of copolymers such as ABS, wherein the determination of the degree of polymerisation of the free polymer and/or the quantity of free polymer are conducted such that it allows for providing a control input to the production process.

This has now been achieved according to the present invention by a process for the production of copolymers comprising:
(i) forming a reaction mixture comprising an elastomer and a vinyl aromatic compound;
(ii) introducing the reaction mixture to a reaction vessel; and
(iii) performing a polymerisation reaction
wherein steps (i)-(iii) are performed in that order
thereby obtaining a copolymer comprising:
(a) a phase comprising a reaction product of the elastomer with the vinyl aromatic compound; and
(b) a phase comprising a reaction product of the vinyl aromatic compound
wherein a sample of the reactor contents is obtained during step (iii) to determine of the formed copolymer:
the content of phase (b); and/or
the molecular weight of phase (b)
wherein the determination of the content of phase (b) in the formed copolymer and the molecular weight of phase (b) is performed by a method comprising isolation of phase (b) from the sample of the formed copolymer and subjecting the obtained phase (b) to gel permeation chromatography in accordance with ASTM D5296-11.

Such process allows for the determination of the content of the phase (b) and of the molecular weight thereof in a quick and efficient manner, allowing for adjustment of process parameters such that the production of products that not correspond to the desired product quality is minimised. It further allows for the simultaneous determination of the content of the phase (b) and the molecular weight thereof. It also provides a process that may be used for a wide variety of polymerisation processes.

The molecular weight may be provided as the weight average molecular weight. Alternatively, the molecular weight may be provided as the number average molecular weight.

The isolation of phase (b) from the sample of the formed copolymer may involve the steps of:
(1) preparing a solution of the formed copolymer in a solvent; and
(2) removing the insoluble fraction from the product obtained in step (1) by a filtration or a centrifugation
wherein the molecular analysis is performed by gel permeation chromatography in accordance with ASTM D5296-11.

In a further embodiment, the reaction mixture may comprise a quantity of a comonomer. This comonomer may for example be selected from acrylonitrile, itaconic acid, acrylamide, methacrylamide, maleic anhydride, maleimide, substituted maleimides, methacylonitrile, α-chloroacrylonitrile, β-chloroacrylonitrile, α-bromoacrylonitrile, acrylic acid, methyl(meth)acrylate, ethyl(meth)acrylate, n-butyl(meth)acrylate, t-butyl(meth)acrylate, n-propyl(meth)acrylate, isopropyl(meth)acrylate, 2-ethylhexyl(meth)acrylate, or glycidyl(meth)acrylates. Preferably, the comonomer is selected from acrylonitrile, methacrylonitrile, methyl(meth)acrylate, ethyl(meth)acrylate, n-propyl(meth)acrylate, or isopropyl(meth)acrylate. Preferably, the comonomer may be selected from acrylonitrile or methyl methacrylate. The reaction mixture may for example comprise ≥0.0 and ≤50.0 wt % of comonomer, alternatively ≤5.0 and ≥30.0 wt % or ≥10.0 and ≤20.0 wt % of the comonomer, with regard to the sum of the weight of the comonomer and the vinylaromatic compound.

The vinyl aromatic compound may for example be selected from styrene, α-methyl styrene, a halogenated styrene such as dibromostyrene, vinyltoluene, vinylxylene, butylstyrene, p-hydroxystyrene, methoxystyrene, or combinations thereof. Preferably, the vinyl aromatic compound is selected from styrene or α-methyl styrene. The reaction mixture may for example comprise ≥50.0 and ≤100.0 wt % of the vinyl aromatic compound, alternatively ≥60.0 and ≤95.0 wt % or ≥80.0 and ≤90.0 wt % of the vinyl aromatic compound, with regard to the sum of the weight of the comonomer and the vinyl aromatic compound. The reaction mixture may for example comprise ≥50.0 and ≤100.0 wt % of the vinyl aromatic compound, alternatively ≥70.0 and ≤95.0 wt % or ≥80.0 and ≤90.0 wt % of the vinyl aromatic compound, with regard to the total weight of the reaction mixture.

The reaction mixture may for example comprise ≥1.0 wt % of the elastomer, alternatively ≥2.0 wt %, or ≥5.0 wt % or ≥10.0 wt %, with regard to the total weight of the reaction mixture. The reaction mixture may for example comprise ≤85.0 wt % of the elastomer, alternatively ≤60.0 wt %, or ≤40.0 wt % or ≤20.0 wt, with regard to the total weight of the reaction mixture. Preferably, the reaction mixture comprises ≥2.0 and ≤85.0 wt % of the elastomer, alternatively ≥5.0 wt % and ≤40.0 wt %, with regard to the total weight of the reaction mixture.

The reaction mixture may for example comprise ≥2.0 and ≤85.0 wt % of the elastomer, ≥50.0 and ≤100.0 wt % of the vinyl aromatic compound and ≥0.0 and ≤50.0 wt % of comonomer, with regard to the total weight of the reaction mixture. Alternatively, the reaction mixture may comprise ≥5.0 and ≤40.0 wt % of the elastomer, ≥60.0 and ≤95.0 wt % of the vinyl aromatic compound and ≥0.0 and ≤10.0 wt % of comonomer, with regard to the total weight of the reaction mixture.

In the process according to the present invention, the elastomer may for example be an elastomer produced using a reaction mixture comprising a conjugated diene, for example a reaction mixture comprising ≥50.0 wt %, alternatively ≥70.0 wt %, alternatively ≥90.0 wt %, of a conjugated diene with regard to the total weight of the reactive ingredients in the reaction mixture. The reaction mixture using in the production may for example comprise one or more C1-C8 alkyl(meth)acrylates, such as for example 0.1-25.0 wt %, alternatively 1.0-20.0 wt %, of C1-C8 alkyl (meth)acrylates, with regard to the total weight of reactive ingredients in the reaction mixture.

As conjugated diene, it is preferred that compounds according to formula (I) are used:

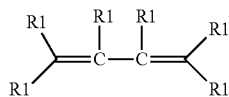

Formula I

Wherein each R1 independently may be hydrogen or a C1-C5 alkyl moiety. Preferably, each R1 independently may be hydrogen, a methyl moiety or an ethyl moiety.

It is particularly preferred that the conjugated diene is one or more selected from butadiene, isoprene, 1,3-heptadiene, methyl-1,3-pentadiene, 2,3-dimethyl-1,3-butadiene, 2-ethyl-1,3-pentadiene, 1,3-hexadiene, and/or 2,4-hexadiene. Particularly exemplary, the conjugated diene may be butadiene or isoprene.

The elastomer may be a homopolymer or a copolymer. In case the elastomer is a copolymer, it may be a copolymer of a conjugated diene and one or more further monomer comprising a vinyl moiety. Such monomer comprising a vinyl moiety may be a monomer comprising one vinyl moiety. Alternatively, such monomer comprising a vinyl moiety may be a monomer comprising two or more vinyl moieties. The monomer comprising a vinyl moiety may for example be selected from aromatic vinylic compounds such as styrene, 3-methylstyrene, 3,5-diethylstyrene, 4-n-propylstyrene, α-methylstyrene, α-methyl vinyltoluene, α-chlorostyrene, α-bromostyrene, dichlorostyrene, dibromostyrene, tetrachlorostyrene, or combinations thereof. Alternatively, the monomer comprising a vinyl moiety may be selected from itaconic acid, acrylamide, methacylamide, maleic anhydride, maleimide, substituted maleimides, acrylonitrile, methacrylonitrile, α-chloroacrylonitrile, β-chloroacrylonitrile, α-bromoacrylonitrile, acrylic acid, methyl (meth)acrylate, ethyl(meth)acrylate, n-butyl(meth)acrylate, t-butyl(meth)acrylate, n-propyl(meth)acrylate, isopropyl (meth)acrylate, 2-ethyl(meth)acrylate, 2-ethylhexyl(meth) acrylate, glycidyl(meth)acrylates, or combinations thereof.

It is preferred that the monomer comprising a vinyl moiety is selected from styrene, α-methylstyrene, n-butyl acrylate, ethyl acrylate, 2-ethylhexyl acrylate acrylic acid, or combinations thereof.

The elastomer may for example be a poly(butadiene), a poly(isoprene) or a poly(butylacrylate). Alternatively, the elastomer may be a copolymer comprising units derived from butadiene and styrene, butadiene and butyl acrylate, butadiene and α-methylstyrene, butadiene and acrylic acid, butadiene and itaconic acid, butadiene and methyl methacrylate, isoprene and styrene, isoprene and butyl acrylate, isoprene and α-methylstyrene, isoprene and methyl methacrylate, isoprene and acrylic acid, or isoprene and itaconic acid. In case the elastomer is a copolymer, the elastomer preferably comprises units derived from butadiene and styrene, butadiene and α-methylstyrene, butadiene and methyl methacrylate, or isoprene and styrene.

The elastomer may be introduced to the reaction mixture on the form of elastomer particles. These particles may for example have an average particle size of ≥0.001 and ≤10.0 µm, preferably ≥0.01 and ≤5.0µ, more preferable ≥0.1 and ≤3.0 µm. The average particle size may be determined by light scattering methods such as dynamic light scattering (DLS).

Alternatively, the elastomer may be introduced to the reaction mixture as a homo- or copolymer with C═C unsaturation, which it may be subjected to crosslinking during the reaction.

The phase (a) comprises a reaction product of the elastomer and the vinyl aromatic compound. In an alternative embodiment, in the case that the reaction mixture comprises comonomer, the phase (a) comprises a reaction product of the elastomer, the vinyl aromatic compound and the comonomer. For example, phase (a) may comprise a reaction product of a poly(butadiene) and styrene, of a poly (butadiene) and α-methyl styrene, or a poly(butadiene) and methyl methacrylate, of poly(isoprene) and styrene, of poly (isoprene) and α-methyl styrene, or of poly(isoprene) and methyl methacrylate. Preferably, phase (a) comprises the reaction product of poly(butadiene) and styrene, of poly (butadiene) and α-methyl styrene or of poly(butadiene) and methyl methacrylate.

Alternatively, in the case that the reaction mixture comprises comonomer, phase (a) may for example comprise a reaction product of a poly(butadiene), styrene and acrylonitrile, of a poly(butadiene), styrene and methyl methacrylate, of a poly(butadiene), α-methyl styrene and acrylonitrile, or of a poly(butadiene), α-methyl styrene and methyl methacrylate. Preferably, phase (a) comprises a reaction product of a poly(butadiene), styrene and acrylonitrile.

It is preferred that phase (a) comprises a copolymer of a poly(butadiene), styrene and acrylonitrile, or a copolymer of a poly(butadiene), styrene and methyl methacrylate.

In an embodiment of the process according to the present invention:
the elastomer is one or more selected from poly(butadiene), poly(styrene-butadiene), poly(butylacrylate), poly(butadiene-acrylonitrile) or poly(isoprene) and/or
the vinyl aromatic compound is selected from styrene, α-methyl styrene, halogenated styrene, vinyltoluene, butylstyrene, p-hydroxystyrene or methoxystyrene.

The phase (b) comprises a reaction product of the vinyl aromatic compound. Alternatively, in the case that the reaction mixture comprises a comonomer, the phase (b) comprises a reaction product of the vinyl aromatic compound and the comonomer. For example, phase (b) may comprise a reaction product of styrene, of methyl methacrylate, or of α-methyl styrene, of styrene and acrylonitrile, of α-methylstyrene and acrylonitrile, of styrene and methyl methacrylate. Preferably, phase (b) comprises a reaction product of styrene, of styrene and acrylonitrile, or of styrene and methyl methacrylate.

It is preferred that phase (b) comprises a polymer of styrene, methyl methacrylate, or a copolymer of styrene and acrylonitrile or of styrene and methyl methacrylate.

The reaction mixture may in a certain embodiment further comprise a comonomer selected from acrylonitrile or methyl methacrylate, wherein phase (a) comprises a reaction product of the elastomer with the vinyl aromatic compound and the comonomer, and wherein phase (b) comprises a reaction product of the vinyl aromatic compound and the comonomer.

The copolymer obtained from the polymerisation reaction (iii) may for example comprise ≥5.0 wt % of phase (b), alternatively ≥10.0 wt %, alternatively ≥25.0 wt %, alternatively ≥50.0 wt % of phase (b), with regard to the total weight of the copolymer. The copolymer obtained from the polymerisation reaction (iii) may for example comprise ≤98.0 wt % of phase (b), alternatively ≤90.0 wt %, alternatively ≤80.0 wt %, alternatively ≤70.0 wt %, alternatively ≤60.0 wt % of phase (b), with regard to the total weight of the copolymer. Preferably, the copolymer obtained from the polymerisation reaction (iii) comprises ≥5.0 wt % and ≤98.0 wt % of phase (b), alternatively ≥10.0 wt % and ≤80.0 wt %, with regard to the total weight of the copolymer.

The copolymer obtained from the polymerisation reaction (iii) may for example comprise ≥2.0 wt % of phase (a), alternatively ≥10.0 wt %, alternatively ≥20.0 wt %, alternatively ≥30.0 wt %, alternatively ≥40.0 wt % of phase (a), with regard to the total weight of the copolymer. The copolymer obtained from the polymerisation reaction (iii) may for example comprise ≤95.0 wt % of phase (a), alternatively ≤90.0 wt %, alternatively ≤75.0 wt %, alternatively ≤50.0 wt % of phase (a), with regard to the total weight of the copolymer.

The copolymer obtained from the polymerisation reaction (iii) may for example comprise ≥2.0 wt % of phase (a) and ≤98.0 wt % of phase (b), alternatively ≥10.0 wt % of phase (a) and ≤90.0 wt % of phase (b), alternatively ≥20.0 wt % of phase (a) and ≤80.0 wt % of phase (b), with regard to the total weight of the copolymer.

The solvent used may for example be chloroform, tetrahydrofuran, methylene chloride, chlorobenzene, diethyl ether, dimethyl formamide, dimethyl sulfoxide, ethyl acetate, toluene, n-methyl-2-pyrrolidinone, 1-butanol, 2-butanol, acetonitrile, benzene, methyl-ethyl ketone or acetone. It is preferred that the solvent is tetrahydrofuran. The solution may for example be prepared at room temperature. Room temperature is to be understood as a temperature of 15-25° C., preferably 20° C. The concentration of copolymer in the solution may for example be ≥1.0 and ≤7.0 mg/ml, alternatively ≥2.0 and ≤6.0 mg/ml. The solution may for example be prepared by exposing the copolymer to the solvent for a period of 3 to 5 hours. The solution may for example also be prepared by subjecting the mixture of the copolymer and the solvent to stirring.

In an embodiment of the invention, the determination of the content of phase (b) in the formed copolymer and the molecular weight of phase (b) may be performed by a method comprising the steps of:
(1) preparing a solution of the formed copolymer in a solvent;
(2) removing the insoluble fraction from the product obtained in step (1) by a filtration in a filter system comprising at least the following filtration layers through which the product obtained in step (1) is transported in this order:
a layer 1 comprising glass fibres such that particles of ≥1.00 μm do not pass these layers;
a layer 2 comprising a membrane filter such that particles of ≥0.45 μm do not pass this layer;
to obtain a filtered sample;
(3) subjecting the filtered sample to gel permeation chromatography in accordance with ASTM D5296-11;
wherein steps (1), (2) and (3) are conducted in that order.

The filter system may comprise a further layer positioned between layer 1 and layer 2, this layer being such that particles of ≥0.70 μm do not pass this layer.

Step (1) for example involves preparing a solution of ≥1.0 and ≤7.0 mg/ml of the formed copolymer in a solvent, wherein the solvent is selected from chloroform, tetrahydrofuran, methylene chloride, chlorobenzene, diethyl ether, dimethyl formamide, dimethyl sulfoxide, ethyl acetate, toluene, n-methyl-2-pyrrolidinone, 1-butanol, 2-butanol, acetonitrile, benzene, methyl-ethyl ketone or acetone, preferably tetrahydrofuran.

Layer 1 may comprise one single filter layer. Alternatively, layer 1 may comprise two or more filter layers. It is preferred that layer 1 comprises glass fibres having a porosity of ≤1.00 μm, such as ≥0.80 μm and ≤1.00 μm. The glass fibres may for example be borosilicate glass fibres. Such layer has a high flow rate.

It is preferred that layer 3 comprises glass fibres having a porosity of ≤0.70 μm, such as ≥0.50 μm and ≤0.70 μm. The glass fibres may for example be borosilicate glass fibres.

It is also preferred that layer 2 comprises a membrane comprising polyamide, polyvinylidene fluoride or polytetrafluoroethylene. For example, the membrane may comprise polytetrafluoroethylene. Layer 2 may have a porosity of ≤0.45 μm, such as ≥0.35 μm and ≤0.45 μm, or ≥0.40 μm and ≤0.45 μm.

The porosity may be determined as the maximum pore diameter in accordance with ASTM E128-99 (2011).

It is preferred that the filter system comprises layers 1 and 2 in this order. Such ordering allows for a desired quality of filtering whilst allowing for a desired high flow rate of the solution passing the filter. It further allows for a sufficient quantity of solution to pass without blockages occurring.

The filter system may for example comprise a membrane such that particles of ≥0.20 μm do not pass this layer.

The membrane in the filter system used in the process according to the present invention may for example comprise polyamide, polyvinylidene fluoride or polytetrafluoroethylene. It is preferred that the membrane comprises polytetrafluoroethylene. In particular, it is preferred that the solvent is tetrahydrofuran and the membrane comprises polytetrafluoroethylene.

A filtered sample may be obtained.

The obtained filtered sample may be subjected to gel permeation chromatography in accordance with ASTM D5296-11. It is preferred that a chromatogram is prepared using a detector allowing to detect the response using refractive index detection. By comparing the surface of the peak obtained via refractive index detection of a filtered sample with the peak of a sample of known content of phase (b), the content of phase (b) in the filtered sample may be determined. The ratio of the surface of the peak of filtered sample to the surface of the peak of the reference sample corresponds to the ratio of the content of phase (b) in the filtered sample to the content of phase (b) in the reference sample.

In an embodiment, the content of phase (b) may be determined by comparison of the elution peak of the chromatogram of the filtered sample obtained using a refractive index detector to detect the response with a reference sample having a defined content of phase (b), wherein the ratio of the surface of the peak if the filtered sample to the surface of the peak of the reference sample corresponds to the ratio of the content of phase (b) in the filtered sample to the of the content of phase (b) in the reference sample.

The process according to the invention may for example be a continuous process, wherein the feed of raw materials to the process and the withdrawal of products and byproducts from the process is done in a continuous way. Such continuous way may mean that a certain portion of raw materials is fed to the process at regular, given intervals, such as for example when the quantity of materials present in the reaction vessel(s) becomes lower than a certain threshold; alternatively, it may mean that raw materials are ongoingly fed to the process in a given ratio. Similarly, it may mean that a certain portion of products and/or byproducts are withdrawn from the process at regular, given intervals, such as for example when the quantity of materials present in the reaction vessel(s) exceeds a certain threshold; alternatively, it may mean that products and/or byproducts are ongoingly withdrawn from the process.

The process may be a continuous process wherein the determined content of phase (b) in the formed copolymer and the molecular weight of phase (b) are used as control inputs for the process.

Alternatively, the process according to the present invention may be a batch process. In such batch process, at least a portion of the reaction mixture may be fed to the reaction vessel(s) prior to the onset of the reaction, and the reaction products may be discharged upon completion of the reaction in the reaction vessel.

The quantity of materials in the process may for example comprise the total of the reactive mixture, any additives, solvents, catalysts as well as intermediate products, products and byproducts present in the reaction vessel(s).

The operation of the process according to the present invention may be particularly advantageous as the process according to the present invention allows for adjustments of process settings whilst the process is operational. The process according to the present invention allows for the reduction of production of copolymers that do not comply to the desired quality in terms of content of free polymer and degree of polymerisation as it allows for the use of the determined content of phase (b) in the formed copolymer and the molecular weight of phase (b) as control inputs for the process. In this contexts, control inputs may be understood as values based on which the settings of the process can be adjusted to ensure the process to operate to produce the desired copolymer.

In a preferred embodiment of the process according to the present invention,
the elastomer is a poly(butadiene);
the vinyl aromatic compound is styrene; and/or
the copolymer is acrylonitrile
wherein the copolymer comprises ≥10.0 and ≤98.0 wt % of phase (b) with regard to the total weight of the copolymer.

The process according to the present invention may for example be a process for the production of a copolymer comprising polymeric moieties derived from a vinyl aromatic compound, a compound comprising a vinyl moiety and a nitrile moiety, and butadiene. Preferably, the process according to the present invention is a process for the production of a copolymer comprising polymeric moieties derived from acrylonitrile, butadiene and styrene.

The copolymer obtained from the process may for example be an acrylonitrile-butadiene-styrene copolymer.

The present invention also relates to a copolymer obtained according to the process according to the invention.

The process according to the invention may be a bulk polymerisation process. Alternatively, the process may be an emulsion polymerisation process. Such processes are known and described in for example Nexant PERP report 2013S5.

In a further embodiment, the present invention also relates to a method for determination of the quantity of a phase of a copolymer comprising the reaction product of a vinyl aromatic compound and a comonomer and the molecular weight of that phase by:
(1) preparing a solution of the copolymer in a solvent of ≥1.0 and ≤7.0 mg/ml;
(2) filtering the solution obtained from (1) in a filter system comprising at least four filtration layers, wherein the filtration layers are constructed as follows:
a layer 1 and 2 comprising glass fibres such that particles of ≥1.00 μm do not pass these layers;
a layer 3 comprising glass fibres such that particles of ≥0.70 μm do not pass this layer; and
a layer 4 comprising a membrane filter such that particles of ≥0.45 μm do not pass this layer;
to obtain a filtered sample;
(3) subjecting the filtered sample to gel permeation chromatography in accordance with ASTM D5296-11;
wherein the solution is filtered in the filter system by passing the solution through the filtration layers of the filter system in such way that the solution passes layer 1, layer 2, layer 3 and layer 4 in this order.

Preferably, the vinyl aromatic compound is selected from styrene, α-methyl styrene, halogenated styrene, vinyl toluene, vinylxylene, butylstyrene, p-hydroxystyrene or methoxystyrene, and/or the comonomer is selected from acrylonitrile, itaconic acid, acrylamide, methacrylamide, maleic anhydride, maleimide, substituted maleimides, methacylonitrile, α-chloroacrylonitrile, β-chloroacrylonitrile, α-bromoacrylonitrile, acrylic acid, methyl(meth)acrylate, ethyl(meth)acrylate, n-butyl(meth)acrylate, t-butyl (meth)acrylate, n-propyl(meth)acrylate, isopropyl(meth) acrylate, 2-ethylhexyl(meth)acrylate, or glycidyl(meth) acrylates; more preferably the vinyl aromatic compound is selected from styrene or α-methylstyrene, and the comonomer is selected from acrylonitrile or methyl(meth)acrylate.

The invention also relates to the use of the method according to the invention in a continuous process or in a batch process for the production of a copolymer comprising polymeric moieties derived from acrylonitrile, butadiene and styrene.

In a most preferred embodiment, the present invention relates to a process for the production of copolymers comprising:
(i) forming a reaction mixture comprising an elastomer and a vinyl aromatic compound;
(ii) introducing the reaction mixture to a reaction vessel; and
(iii) performing a polymerisation reaction
wherein steps (i)-(iii) are performed in that order
to obtain a copolymer comprising:
(a) a phase comprising a reaction product of the elastomer with the vinyl aromatic compound; and
(b) a phase comprising a reaction product of the vinyl aromatic compound
wherein a sample of the reactor contents is obtained during step (iii) to determine of the formed copolymer:
the content of phase (b); and/or
the molecular weight of phase (b)
wherein the determination of the content of phase (b) in the formed copolymer and the molecular weight of phase (b) is performed by a method comprising isolation of phase (b) from the sample of the formed copolymer and subjecting the obtained phase (b) to molecular analysis;
wherein
the elastomer is one or more selected from poly(butadiene), poly(styrene-butadiene), poly(butylacrylate), poly(butadiene-acrylonitrile) or polystyrene and/or
the vinyl aromatic compound is selected from styrene or α-methyl styrene wherein the determination of the content of phase (b) in the formed copolymer and the molecular weight of phase (b) is performed by a method comprising the steps of:
(1) preparing a solution of ≥1.0 and ≤7.0 mg/ml of the formed copolymer in a solvent;
(2) removing the insoluble fraction from the product obtained in step (1) by a filtration in a filter system comprising at least the following filtration layers through which the product obtained in step (1) is transported in this order:
a layer 1 comprising glass fibres such that particles of ≥1.00 μm do not pass these layers;
a layer 2 comprising a membrane filter such that particles of ≥0.45 μm do not pass this layer;
to obtain a filtered sample;
(3) subjecting the filtered sample to gel permeation chromatography in accordance with ASTM D5296-11;
wherein steps (1), (2) and (3) are conducted in that order;
wherein the content of phase (b) is determined by comparison of the elution peak of the chromatogram of the filtered sample obtained using a refractive index detector to detect the response with a reference sample having a defined content of phase (b), wherein the ratio of the surface of the peak if the filtered sample to the surface of the peak of the reference sample corresponds to the ratio of the content of phase (b) in the filtered sample to the of the content of phase (b) in the reference sample.

It is preferred that:
the elastomer is a poly(butadiene);
the vinyl aromatic compound is styrene; and/or
the copolymer is acrylonitrile;
and that the copolymer comprises ≥5.0 and ≤98.0 wt % of phase (b) with regard to the total weight of the copolymer.

In a further preferred embodiment, the present invention relates to a process for the production of copolymers comprising:
(i) forming a reaction mixture comprising an elastomer and a vinyl aromatic compound;
(ii) introducing the reaction mixture to a reaction vessel; and
(iii) performing a polymerisation reaction
wherein steps (i)-(iii) are performed in that order
thereby obtaining a copolymer comprising:
(a) a phase comprising a reaction product of the elastomer with the vinyl aromatic compound; and
(b) a phase comprising a reaction product of the vinyl aromatic compound
wherein a sample of the reactor contents is obtained during step (iii) to determine of the formed copolymer:
the content of phase (b); and/or
the molecular weight of phase (b)
wherein the determination of the content of phase (b) in the formed copolymer and the molecular weight of phase (b) is performed by a method comprising isolation of phase (b) from the sample of the formed copolymer and subjecting the obtained phase (b) to molecular analysis;
wherein
the elastomer is one or more selected from poly(butadiene), poly(styrene-butadiene), poly(butylacrylate), poly(butadiene-acrylonitrile) or polystyrene and/or
the vinyl aromatic compound is selected from styrene or α-methyl styrene
wherein the determination of the content of phase (b) in the formed copolymer and the molecular weight of phase (b) is performed by a method comprising the steps of:
(1) preparing a solution of ≥1.0 and ≤7.0 mg/ml of the formed copolymer in a solvent;
(2) removing the insoluble fraction from the product obtained in step (1) by a filtration in a filter system comprising at least the following filtration layers through which the product obtained in step (1) is transported in this order:
a layer 1 comprising glass fibres such that particles of ≥1.00 μm do not pass these layers;
a layer 2 comprising a membrane filter such that particles of ≥0.45 μm do not pass this layer;
to obtain a filtered sample;
(3) subjecting the filtered sample to gel permeation chromatography in accordance with ASTM D5296-11;
wherein steps (1), (2) and (3) are conducted in that order;
wherein the content of phase (b) is determined by comparison of the elution peak of the chromatogram of the filtered sample obtained using a refractive index detector to detect the response with a reference sample having a defined content of phase (b), wherein the ratio of the surface of the peak if the filtered sample to the surface of the peak of the reference sample corresponds to the ratio of the content of phase (b) in the filtered sample to the of the content of phase (b) in the reference sample.

The invention in certain of its embodiments further relates to the following aspects.

Aspect 1: Process for the production of copolymers comprising:
(i) forming a reaction mixture comprising an elastomer and a vinyl aromatic compound;
(ii) introducing the reaction mixture to a reaction vessel; and
(iii) performing a polymerisation reaction
wherein steps (i)-(iii) are performed in that order
thereby obtaining a copolymer comprising:

(a) a phase comprising a reaction product of the elastomer with the vinyl aromatic compound; and
(b) a phase comprising a reaction product of the vinyl aromatic compound
wherein a sample of the reactor contents is obtained during step (iii) to determine of the formed copolymer:
the content of phase (b); and/or
the molecular weight of phase (b)
wherein the determination of the content of phase (b) in the formed copolymer and the molecular weight of phase (b) is performed by a method comprising isolation of phase (b) from the sample of the formed copolymer and subjecting the obtained phase (b) to molecular analysis.

Aspect 2: Process according to aspect 1 wherein the method of isolation of phase (b) from the sample of the formed copolymer involves the steps of:
(1) preparing a solution of the formed copolymer in a solvent; and
(2) removing the insoluble fraction from the product obtained in step (1) by a filtration or a centrifugation
wherein the molecular analysis is performed by gel permeation chromatography in accordance with ASTM D5296-11.

Aspect 3: Process according to any one of aspects 1-2 wherein
the elastomer is one or more selected from poly(butadiene), poly(styrene-butadiene), poly(butylacrylate), poly(butadiene-acrylonitrile) or poly(isoprene) and/or
the vinyl aromatic compound is selected from styrene, α-methyl styrene, halogenated styrene, vinyltoluene, butylstyrene, p-hydroxystyrene or methoxystyrene.

Aspect 4: Process according to any one of aspects 1-3 wherein the reaction mixture further comprises a comonomer selected from acrylonitrile, itaconic acid, acrylamide, methacrylamide, maleic anhydride, maleimide, substituted maleimides, methacylonitrile, α-chloroacrylonitrile, β-chloroacrylonitrile, α-bromoacrylonitrile, acrylic acid, methyl (meth)acrylate, ethyl(meth)acrylate, n-butyl(meth)acrylate, t-butyl(meth)acrylate, n-propyl(meth)acrylate, isopropyl (meth)acrylate, 2-ethylhexyl(meth)acrylate, or glycidyl (meth)acrylates, wherein phase (a) comprises a reaction product of the elastomer with the vinyl aromatic compound and the comonomer, and wherein phase (b) comprises a reaction product of the vinyl aromatic compound and the comonomer.

Aspect 5: Process according to any one of aspects 1-4, wherein the determination of the content of phase (b) in the formed copolymer and the molecular weight of phase (b) is performed by a method comprising the steps of:
(1) preparing a solution of the formed copolymer in a solvent;
(2) removing the insoluble fraction from the product obtained in step (1) by a filtration in a filter system comprising at least the following filtration layers through which the product obtained in step (1) is transported in this order:
a layer 1 comprising glass fibres such that particles of ≥1.00 µm do not pass these layers;
a layer 2 comprising a membrane filter such that particles of ≥0.45 µm do not pass this layer;
to obtain a filtered sample;
(3) subjecting the filtered sample to gel permeation chromatography in accordance with ASTM D5296-11;
wherein steps (1), (2) and (3) are conducted in that order.

Aspect 6: Process according to any one of aspects 1-5, wherein the filter system comprises a further layer positioned between layer 1 and layer 2, this layer being such that particles of ≤0.70 µm do not pass this layer.

Aspect 7: Process according to any one of aspects 5-6, wherein step (1) involves preparing a solution of ≥1.0 and ≤7.0 mg/ml of the formed copolymer in a solvent, wherein the solvent is selected from chloroform, tetrahydrofuran, methylene chloride, chlorobenzene, diethyl ether, dimethyl formamide, dimethyl sulfoxide, ethyl acetate, toluene, n-methyl-2-pyrrolidinone, 1-butanol, 2-butanol, acetonitrile, benzene, methyl-ethyl ketone or acetone, preferably tetrahydrofuran.

Aspect 8: Process according to any one of aspects 1-7, wherein the content of phase (b) is determined by comparison of the elution peak of the chromatogram of the filtered sample obtained using a refractive index detector to detect the response with a reference sample having a defined content of phase (b), wherein the ratio of the surface of the peak if the filtered sample to the surface of the peak of the reference sample corresponds to the ratio of the content of phase (b) in the filtered sample to the of the content of phase (b) in the reference sample.

Aspect 9: Process according to any one of aspects 1-8 wherein the process is a continuous process wherein the determined content of phase (b) in the formed copolymer and the molecular weight of phase (b) are used as control inputs for the process.

Aspect 10: Process according to any one of aspects 4-9 wherein:
the elastomer is a poly(butadiene);
the vinyl aromatic compound is styrene; and/or
the copolymer is acrylonitrile
wherein the copolymer comprises ≥5.0 and ≤98.0 wt % of phase (b) with regard to the total weight of the copolymer.

Aspect 11: Process according to any one of aspects 1-10 wherein the copolymer obtained from the process is an acrylonitrile-butadiene-styrene copolymer.

Aspect 12: Copolymer obtained according to the process of any one of Aspects 1-11.

Aspect 13: Method for determination of the quantity of a phase of a copolymer comprising the reaction product of a vinyl aromatic compound and a compound comprising a vinyl moiety and a nitrile moiety and the molecular weight of that phase by:
(1) preparing a solution of the copolymer in a solvent of ≥1.0 and ≤7.0 mg/ml;
(2) filtering the solution obtained from (1) in a filter system comprising at least four filtration layers, wherein the filtration layers are constructed as follows:
a layer 1 and 2 comprising glass fibres such that particles of ≥1.00 µm do not pass these layers;
a layer 3 comprising glass fibres such that particles of ≥0.70 µm do not pass this layer; and
a layer 4 comprising a membrane filter such that particles of ≥0.45 µm do not pass this layer;
to obtain a filtered sample;
(3) subjecting the filtered sample to gel permeation chromatography in accordance with ASTM D5296-11;
wherein the solution is filtered in the filter system by passing the solution through the filtration layers of the filter system in such way that the solution passes layer 1, layer 2, layer 3 and layer 4 in this order.

Aspect 14: Method according to aspect 13 wherein
the vinyl aromatic compound is selected from styrene, α-methyl styrene, halogenated styrene, vinyl toluene, vinylxylene, butylstyrene, p-hydroxystyrene or methoxystyrene; and/or the comonomer is selected from acrylonitrile, itaconic acid, acrylamide, methacrylamide, maleic anhydride, maleimide, substituted maleimides, methacylonitrile, α-chloroacrylonitrile, β-chloroacrylonitrile, α-bromo-acrylonitrile, acrylic acid, methyl(meth)acrylate, ethyl (meth)acrylate, n-butyl(meth)acrylate, t-butyl(meth) acrylate, n-propyl(meth)acrylate, isopropyl(meth) acrylate, 2-ethylhexyl(meth)acrylate, or glycidyl(meth) acrylates.

Aspect 15: Use of the method according to any one of aspects 13-14 in a continuous process or in a batch process for the production of a copolymer comprising polymeric moieties derived from acrylonitrile, butadiene and styrene.

The invention will now be illustrated by the following non-limiting examples.

In a continuous production process for the production of ABS copolymers, a set of samples was collected of copolymers obtained from the reaction of a reaction mixture comprising poly(butadiene), styrene and acrylonitrile, differing in molecular weight and quantify of the phase of free SAN. For each of those samples, the weight average molecular weight, the number average molecular weight and the quantity of the phase of free SAN was determined according to the methods as described below.

EXPERIMENT 1: ISOLATION OF THE FREE SAN PHASE ACCORDING TO THE INVENTION USING TETRAHYDROFURAN AS SOLVENT

A fraction of each sample was dissolved in a quantity of tetrahydrofuran at room temperature for 3 hours such that a solution was obtained having a concentration of 5.0 mg/ml of copolymer.

The obtained solution was subjected to filtration using a Whatman GD/X syringe filter comprising a first and a second layer of glass microfibers of type GMF 150 to filter out particles of ≥1.00 μm; a third layer of glass microfibers to filter out particles of ≥0.70 μm; and a fourth layer of a PTFE membrane to filter out particles of ≥0.45 μm.

The obtained filtered samples were subjected to gel permeation chromatography in accordance with ASTM D5296-11. An elution curve was prepared via refractive index detection wherein the surface of the peak was determined and compared with the area of the peak of samples with known free SAN, by such determining the free SAN content of the samples.

The weight average molecular weight and the number average molecular weight were determined in accordance with ASTM D5296-11.

The duration of the test was 3.8 hours.

EXPERIMENT 2: ISOLATION OF THE FREE SAN PHASE ACCORDING TO THE INVENTION USING CHLOROFORM AS SOLVENT

A fraction of each sample was dissolved in a quantity of chloroform at room temperature for 3 hours such that a solution was obtained having a concentration of 5.0 mg/ml of copolymer.

The obtained solution was subjected to filtration using a Whatman GD/X syringe filter comprising a first and a second layer of glass microfibers of type GMF 150 to filter out particles of ≥1.00 μm; a third layer of glass microfibers to filter out particles of ≥0.70 μm; and a fourth layer of a PTFE membrane to filter out particles of ≥0.45 μm.

The obtained filtered samples were subjected to gel permeation chromatography in accordance with ASTM D5296-11. An elution curve was prepared via refractive index detection wherein the surface of the peak was determined and compared with the area of the peak of samples with known free SAN, by such determining the free SAN content of the samples.

The weight average molecular weight and the number average molecular weight were determined in accordance with ASTM D5296-11.

The duration of the test was 3.8 hours.

EXPERIMENT 3(C): ISOLATION OF THE FREE SAN PHASE VIA CENTRIFUGE METHOD (COMPARATIVE)

A solution of 0.5 g of copolymer in 30 ml acetone (16.7 mg/ml) for each of the samples was prepared at room temperature for 16 hours. The obtained solutions were each subjected to centrifugation in a Sroval RC6 centrifuge at 2000 RPM operated at 5° C. The obtained sample was dried for 16 hours at 60° C. under vacuum. The obtained fraction, representing the free SAN in the sample, was weighed, from which the quantity of free SAN in the sample was determined by comparing the weight obtained from centrifugation with the weight of the original sample. The obtained fraction was subsequently subjected to gel permeation chromatography in accordance with ASTM D5296-11 to determine the weight average molecular weight and the number average molecular weight.

The duration of the test was >32 hours.

The results are presented in table 1.

TABLE 1

| Sample | Experiment 1 | | | Experiment 2 | | | Experiment 3 (C) | | |
|---|---|---|---|---|---|---|---|---|---|
| | SAN | $M_w$ | $M_n$ | SAN | $M_w$ | $M_n$ | SAN | $M_w$ | $M_n$ |
| S1 | 55 | 147 | 49 | 61 | 142 | 47 | 52 | 145 | 43 |
| S2 | 55 | 129 | 47 | 60 | 126 | 38 | 51 | 126 | 40 |
| S3 | 53 | 111 | 40 | 59 | 109 | 35 | 50 | 109 | 36 |
| S4 | 50 | 135 | 47 | 55 | 134 | 43 | 47 | 134 | 39 |
| S5 | 53 | 144 | 47 | 60 | 139 | 41 | 51 | 140 | 43 |
| S6 | 53 | 128 | 46 | 59 | 123 | 38 | 51 | 126 | 39 |
| S7 | 52 | 117 | 40 | 58 | 113 | 35 | 50 | 115 | 37 |
| S8 | 50 | 136 | 45 | 55 | 135 | 47 | 49 | 134 | 39 |

Wherein

SAN is the fraction of free SAN in the copolymer samples in weight % with regard to the total weight of the copolymer sample;

$M_w$ is the weight average molecular weight of the free SAN in kg/mol as determined in accordance with ASTM D5296-11;

$M_n$ is the number average molecular weight of the free SAN in kg/mol as determined in accordance with ASTM D5296-11.

Comparing the obtained SAN, $M_w$ and $M_n$ values of the samples S1-S8 tested according to the methods of experiments 1 and 2 with the comparative method 3 demonstrates that the process according to the invention allows for a quicker determination of these properties whilst still providing the properties to the desired degree of accuracy.

The above presented examples demonstrate that the process according to the present invention allows for the determination of the fraction of free SAN in copolymer samples, the number average molecular weight, and the weight average molecular weight of the free SAN in a quicker way, via a method that allows for providing a control input to the production process of the copolymer, thus allowing to for example reduce the quantity of poor quality copolymer produced in case the process is not operating according to the correct conditions.

The invention claimed is:

1. A process for the production of copolymers comprising:
   (i) forming a reaction mixture comprising an elastomer and a vinyl aromatic compound;
   (ii) introducing the reaction mixture to a reaction vessel; and
   (iii) performing a polymerization reaction;
   wherein steps (i) (iii) are performed in that order;
   thereby obtaining a copolymer comprising:
      (a) a phase comprising a reaction product of the elastomer with the vinyl aromatic compound; and
      (b) a phase comprising a reaction product of the vinyl aromatic compound;
   wherein a sample from the reaction vessel is obtained during step (iii) to determine of the formed copolymer:
      the content of phase (b); and/or
      the molecular weight of phase (b);
   wherein the determination of the content of phase (b) in the formed copolymer and the molecular weight of phase (b) is performed by a method comprising isolation of phase (b) from the sample of the formed copolymer by (1) preparing a solution of the formed copolymer in a solvent; and (2) removing an insoluble fraction from the solution obtained in step (1) by filtration to obtain phase (b) as a filtered sample and subjecting the obtained phase (b) to molecular analysis, wherein
   the filtration is in a filter system comprising at least the following filtration layers through which the solution is transported in this order;
      a layer 1 comprising glass fibres such that particles of ≥1.00 μm do not pass these layers;
      a layer 2 comprising a membrane filter such that particles of ≥0.45 μm do not pass this layer; and
      the molecular analysis is performed by gel permeation chromatography in accordance with ASTM D5296-11.

2. The process according to claim 1, wherein
   the elastomer is one or more selected from poly(butadiene), poly(styrene-butadiene), poly(butylacrylate), poly(butadiene-acrylonitrile) or poly(isoprene); and/or
   the vinyl aromatic compound is selected from styrene, α-methyl styrene, halogenated styrene, vinyltoluene, butylstyrene, p-hydroxystyrene or methoxy styrene.

3. The process according to claim 1, wherein the reaction mixture further comprises a comonomer selected from acrylonitrile, itaconic acid, acrylamide, methacrylamide, maleic anhydride, maleimide, substituted maleimides, methacylonitrile, α-chloroacrylonitrile, β-chloroacrylonitrile, α-bromoacrylonitrile, acrylic acid, methyl(meth)acrylate, ethyl (meth)acrylate, n-butyl(meth)acrylate, t-butyl(meth) acrylate, n-propyl(meth)acrylate, isopropyl(meth)acrylate, 2-ethylhexyl(meth)acrylate, or glycidyl(meth)acrylates, wherein phase (a) comprises a reaction product of the elastomer with the vinyl aromatic compound and the comonomer, and wherein phase (b) comprises a reaction product of the vinyl aromatic compound and the comonomer.

4. The process according to claim 1, wherein the filter system comprises a further layer positioned between layer 1 and layer 2, this layer being such that particles of ≥0.70 μm do not pass this layer.

5. The process according to claim 1, wherein the step of preparing the solution involves preparing a solution of ≥1.0 and ≤7.0 mg/ml of the formed copolymer in a solvent, wherein the solvent is selected from chloroform, tetrahydrofuran, methylene chloride, chlorobenzene, diethyl ether, dimethyl formamide, dimethyl sulfoxide, ethyl acetate, toluene, n-methyl-2-pyrrolidinone, 1-butanol, 2-butanol, acetonitrile, benzene, methyl-ethyl ketone or acetone.

6. The process according to claim 1, wherein a chromatogram having an elution peak is obtained by the gel permeation chromatography and the content of phase (b) is determined by comparison of the elution peak of the chromatogram of the filtered sample obtained using a refractive index detector to detect the response with a reference sample having a defined content of phase (b), wherein the ratio of the surface of the peak of the filtered sample to the surface of the peak of the reference sample corresponds to the ratio of the content of phase (b) in the filtered sample to the content of phase (b) in the reference sample.

7. The process according to claim 1, wherein the process is a continuous process wherein the determined content of phase (b) in the formed copolymer and the molecular weight of phase (b) are used as control inputs for the process.

8. The process according to claim 3, wherein:
   the elastomer is poly(butadiene);
   the vinyl aromatic compound is styrene; and/or
   the comonomer is acrylonitrile;
   wherein the copolymer comprises ≥5.0 and ≤98.0 wt % of phase (b) with regard to the total weight of the copolymer.

9. The process according to claim 1, wherein the copolymer obtained from the process is an acrylonitrile-butadiene-styrene copolymer.

10. The process according to claim 5, wherein the solvent is tetrahydrofuran.

11. A method for determination of the quantity of a phase of a copolymer and the molecular weight of the phase of the copolymer, wherein the phase of the copolymer comprising the reaction product of a vinyl aromatic compound and a compound comprising a vinyl moiety and a nitrile moiety, the method comprising:
   (1) preparing a solution of the copolymer in a solvent of ≥1.0 and ≤7.0 mg/ml;
   (2) filtering the solution obtained from (1) in a filter system comprising at least four filtration layers, wherein the filtration layers are constructed as follows:
      a layer 1 and 2 comprising glass fibres such that particles of ≥1.00 μm do not pass these layers;
      a layer 3 comprising glass fibres such that particles of ≥0.70 μm do not pass this layer; and
      a layer 4 comprising a membrane filter such that particles of ≥0.45 μm do not pass this layer;
      to obtain a filtered sample;
   (3) subjecting the filtered sample to gel permeation chromatography in accordance with ASTM D5296-11;
   wherein the solution is filtered in the filter system by passing the solution through the filtration layers of the filter system in such way that the solution passes layer 1, layer 2, layer 3 and layer 4 in this order.

* * * * *